Patented Dec. 26, 1922.

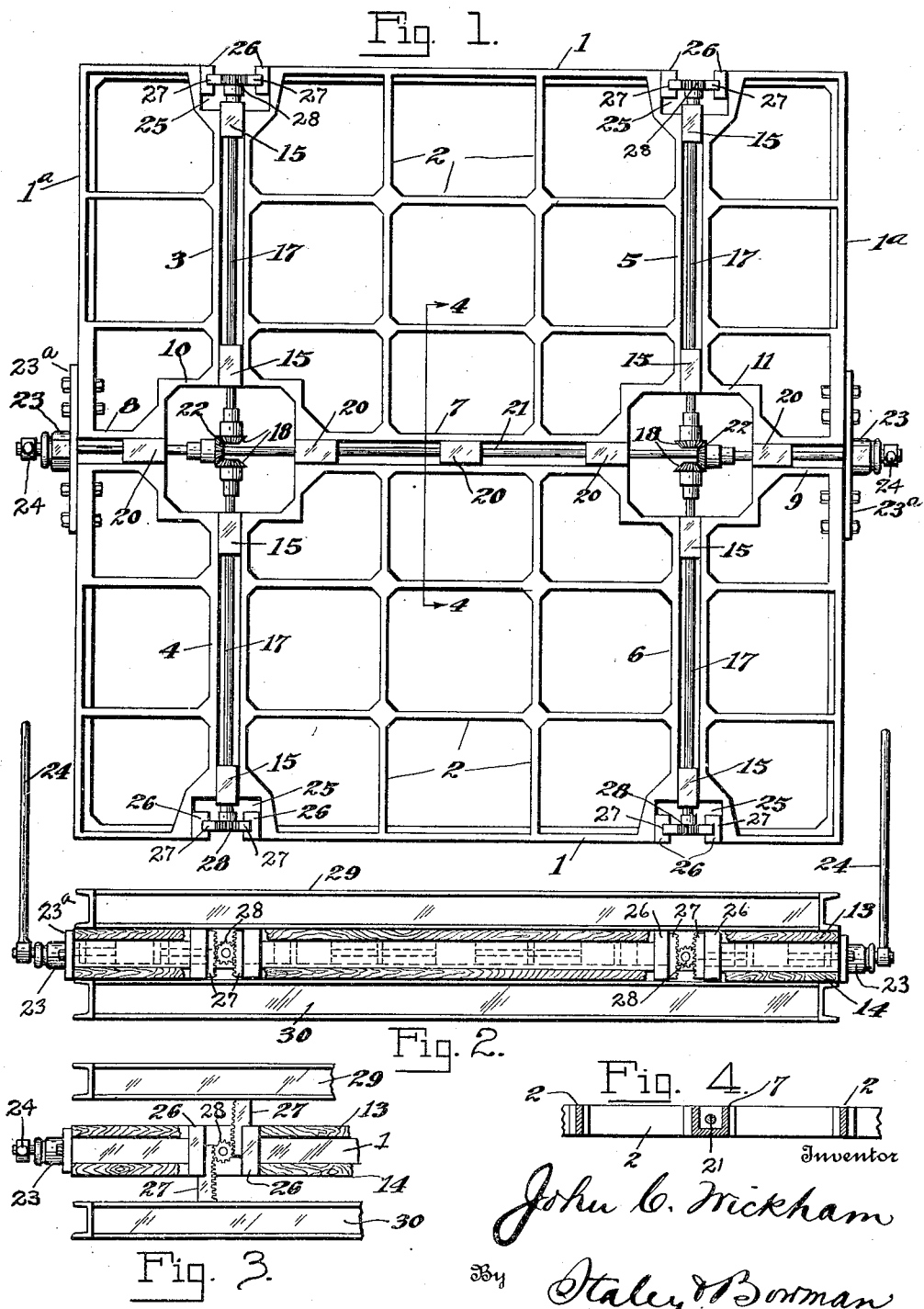

1,439,776

UNITED STATES PATENT OFFICE.

JOHN C. WICKHAM, OF SPRINGFIELD, OHIO, ASSIGNOR TO THE WICKHAM PIANO PLATE COMPANY, OF SPRINGFIELD, OHIO, A CORPORATION OF OHIO.

MOLDING APPARATUS.

Application filed September 14, 1921. Serial No. 500,580.

*To all whom it may concern:*

Be it known that I, JOHN C. WICKHAM, a citizen of the United States, residing at Springfield, in the county of Clark and State of Ohio, have invented certain new and useful Improvements in Molding Apparatus, of which the following is a specification.

My invention relates to improvements in molding apparatus, it more particularly relating to mechanism for separating the pattern from the molds.

An object of my invention is to devise a separating apparatus of the character referred to which will be particularly applicable to molds for comparatively large castings, such as piano plates, so constructed as to eliminate to a large degree side draft and torsional stress upon the operating parts by applying the power to effect the separation at points intermediate the sides of the mold and pattern parts.

A further object of the invention is to provide an apparatus of this character which will be simple in construction and effective in operation.

In the accompanying drawings:—

Fig. 1 is a plan view of the supporting frame for the patterns showing my improvements applied thereto.

Fig. 2 is an end view of a mold equipped with my apparatus.

Fig. 3 is an end view of a portion of the parts shown in Fig. 2 showing the same in separating position.

Fig. 4 is a section on the line 4—4 of Fig. 1.

Referring to the drawings, there is shown a metallic frame which I employ for supporting the pattern. This frame is constructed of side bars 1, end bars 1ª, intermediate cross-bars 2, a plurality of channel-shaped bars, 3, 4, 5, 6, 7, 8, and 9 and a pair of pocket forming members 10 and 11, all integrally cast together. The pattern parts are mounted or formed upon a pair of boards 13 and 14 (Fig. 2) which parts are firmly secured in any suitable manner to the top and bottom of this metallic frame, the structure forming a match board.

The bars 3, 4, 5 and 6 are arranged in pairs, 3 and 4 constituting one pair and 5 and 6 the other pair. The bars of each pair extend crosswise the structure in axial alignment with each other. The bars 7, 8 and 9 extend longitudinally in axial alignment midway the width of the structure. All of the bars terminate at the respective pockets 10 and 11.

Mounted in bearing boxes 15 suitably secured in the channel bars 3, 4, 5 and 6 are two pair of shafts 17, the inner end of each of which projects into its corresponding pocket 10 or 11 and has connected therewith a bevelled gear 18; the shafts of each pair being axially aligned. Mounted in bearing blocks 20 suitably secured in the channel bars 7, 8 and 9 is a shaft 21 which extends between the inner ends of the respective shafts 17 and has connected therewith bevelled pinions 22 meshing with the gears 18. The ends of the shaft 21 are also mounted in bearings 23, intergrally formed with brackets 23ª secured to the ends 1ª. Each end of this shaft 21 has a handle 24 by which it may be rotated. The outer ends of the respective channelled-shaped bars 3, 4, 5 and 6 are enlarged and formed with pockets 25. Secured in each pocket 25 is a pair of grooved guide blocks 26 having slidably mounted therein jacks in the nature of rack bars 27, the teeth of which face each other. On the end of each shaft 17 is a pinion 28 in mesh with the teeth of the respective rack bars. These rack bars are disposed in line with the outer edges of the cope 29 and drag 30 as a result of which, when the shaft 21 is rocked, one rack bar of each pair will be raised and the other lowered so as to elevate the cope from the pattern and the pattern from the drag, which parts may be provided with the usual vertical guides (not shown.)

By the construction described, a simple mechanism is provided which will effectively separate the pattern and mold parts uniformly throughout the parting lines. By reason of the rack-bar construction, jacks are provided which will exert their power in an accurate perpendicular direction relatively to the parting lines of the respective mold and pattern parts, while by having the power shaft arranged in a central position in the structure, the power is transmitted therefrom equally in both directions, thus avoiding side draft and undue torsional stress, which is especially important when the mechanism is used with large molds.

Having thus described my invention, I claim:—

1. In a structure of the character described, the combination, with mold members, of a pattern support, a plurality of movable devices arranged at the edges of said support for engagement with said mold members, and mechanism carried by said support, including a centrally arranged power shaft, for elevating some of said devices and depressing others.

2. In a structure of the character described, the combination with mold members, of a pattern support, a plurality of movable jacks having rack teeth thereon arranged at the edges of said support in line with said mold members, said jacks being arranged in pairs, a pinion carried by said support in mesh with the teeth of each pair of jacks, and mechanism also carried by said support, including a centrally arranged power shaft, for operating said devices.

3. In a structure of the character described, the combination with mold members, of a pattern support, a plurality of vertically movable jacks having rack teeth arranged at the edges of said support in line with said mold members, said jacks being arranged in pairs, an operating shaft carried by said support for each pair of jacks having a pinion in mesh with the teeth thereof, and a centrally arranged power shaft also carried by said support common to all of said operating shafts for operating the same.

4. In a structure of the character described, the combination, with mold members, of a pattern support, a plurality of movable jacks, having rack teeth carried by said supports, said jacks being arranged in pairs, an operating shaft carried by said support for each pair of jacks having a pinion in mesh with the teeth thereof, all of said operating shafts being arranged in the same direction across said support, and a centrally arranged power shaft carried by said support together with bevelled gear connections between the same and the respective operating shafts.

5. In a structure of the character described, the combination, with mold members, of a pattern support arranged to be placed between said mold members, a series of vertically movable independently mounted jacks carried by said support in line with said mold members, and mechanism carried by said support for simultaneously raising part of said jacks and depressing others.

6. In a structure of the character described, the combination, with mold members, of a pattern support arranged to be placed between said members, a plurality of pair of jacks having rack teeth slidably carried by said support, a plurality of shafts, one for each pair of jacks, having a pinion in mesh with the teeth thereof, said shafts being journaled in said support, and means carried on said support for rotating said shafts.

In testimony whereof, I have hereunto set my hand this 12th day of September, 1921.

JOHN C. WICKHAM.